(12) United States Patent
Bruzzone

(10) Patent No.: US 6,271,791 B1
(45) Date of Patent: Aug. 7, 2001

(54) RADIO-SIGNAL DIRECTION FINDING

(75) Inventor: Raul A. Bruzzone, Le Mans (FR)

(73) Assignee: U.S. Philips Corporation, NY, NY (US)

(*) Notice: Subject to any disclaimer, the term of this patent is extended or adjusted under 35 U.S.C. 154(b) by 0 days.

(21) Appl. No.: 09/428,773

(22) Filed: Oct. 28, 1999

(30) Foreign Application Priority Data

Nov. 3, 1998 (EP) .................................................. 98402738

(51) Int. Cl.[7] .................................................. G01S 5/04
(52) U.S. Cl. .................................. 342/442; 342/434
(58) Field of Search .................................. 342/433, 434, 342/442

(56) References Cited

U.S. PATENT DOCUMENTS

| | | | |
|---|---|---|---|
| 3,813,672 | 5/1974 | Weisser | 343/113 R |
| 4,647,935 | * 3/1987 | Helbing | 342/433 |
| 4,719,469 | * 1/1988 | Beier et al. | 342/434 |
| 4,978,963 | * 12/1990 | Thorpe | 342/433 |
| 5,497,161 | 3/1996 | Tsui | 342/147 |

FOREIGN PATENT DOCUMENTS

0373604A1   6/1990 (EP) .................................. G01S/3/46

OTHER PUBLICATIONS

By D. Fink et al, "Electronic Engineers" Handbook, 4th Edition, (ISBN 0–07–021077–2), Section 29.3.1.1.1, pp. 29.82.

* cited by examiner

Primary Examiner—Gregory C. Issing
(74) Attorney, Agent, or Firm—Dicran Halajian

(57) ABSTRACT

Radio-signal direction finding is performed in the following manner. There is a plurality of antennas (A) at different locations. A switchable antenna coupler (SAC) switches (SW) from one antenna (A[i]) being coupled to a radio-signal input (INP), to another antenna (A[i+1]) being coupled to the radio-signal input (INP). A radio-signal processor (ASP) processes a radio signal (AS) which is present at the radio-signal input (INP) so as to obtain a phase-detection input signal (PDIS). A phase-change detector (PCD) detects a phase change ($\Delta\phi$) in the phase-detection input signal (PDIS) due to the switching (SW) from the one antenna (A[i]) to the other antenna (A[i+1]). A calculator (CAL) calculates the direction (DIR) of the radio-signal source (SRC) on the basis of this phase change ($\Delta\phi$). This manner of performing radio-signal finding can be implemented at relatively modest cost because it requires only one radio-signal processor. It is particularly suitable for use in a wireless communication apparatus, for example, to select the antenna which will provide the best signal quality.

4 Claims, 2 Drawing Sheets

RADIO-SIGNAL DIRECTION FINDING

FIELD OF THE INVENTION

The invention relates to radio-signal direction finding. The invention may be used, for example, for controlling an antenna array such that the antenna array provides an antenna pattern that is directed to a radio-signal source.

BACKGROUND ART

Radio-signal direction finding can be carried out as follows. There are two antennas at different locations. Both antennas receive a signal from a source whose direction has to be determined. The direction is calculated on the basis of a phase difference between the signal received by the one antenna and the signal received by the other antenna. This principle of radio-signal direction appears to be described in the Electronic Engineers' Handbook, $4^{th}$ edition, by D. Fink et al. (ISBN 0-07-021077-2), section 29.3.1.1.1, page 29.82.

SUMMARY OF THE INVENTION

It is an object of the invention to provide radio-signal direction finding at relatively modest cost.

The invention takes the following aspects into consideration. It will often not be possible to determine the direction in which the source of a radio signal is located, by directly measuring a phase difference between two antennas. The reason for this is that, in practice, an antenna will not exclusively receive a radio signal from the source whose direction has to be determined. It may also receive radio signals from other sources. These unwanted radio signals will diminish the precision with which the direction can be determined, or may even make it impossible to determine the direction.

A possible solution is to suitably process each antenna signal, which often is a mixture of various radio signals, so as to suppress unwanted radio signals. Accordingly, a pair of phase-detection input signals will be obtained. The phase difference between the pair of phase-detection input signals is measured and the direction is determined on the basis of the phase difference measured. This solution requires a radio-signal processor for each antenna. Each radio-signal processor will be functionally equivalent to a receiver and will thus be relative complex. Consequently, the solution described in this paragraph is relatively expensive.

According to the invention, a switchable antenna-coupler switches from one antenna being coupled to a radio-signal input, to another antenna being coupled to the radio-signal input. A radio-signal processor processes a radio signal which is present at the radio-signal input so as to obtain a phase-detection input signal. A phase-change detector detects a phase change in the phase-detection input signal due to the switching from the one antenna to the other antenna. A calculator calculates the direction in which the source of the radio signal is located on the basis of the phase change. Accordingly, the invention allows a sufficiently precise phase-difference measurement with one radio-signal processor only. Thus, the invention allows direction finding at relatively modest cost.

Another advantage of the invention relates to the following aspects. A radio-signal processor introduces some phase shift. The phase shift will vary due to temperature changes, aging and component spread. In principle, these phase-shift variations will not affect the phase-change due to the switching from the one antenna to the other antenna. Since, according to the invention, the direction is calculated on the basis of this phase change, the invention allows a relatively good precision in direction finding.

The invention and additional features, which may be optionally used to implement the invention to advantage, are apparent from and elucidated with reference to the drawings described hereinafter.

DETAILED DESCRIPTION OF THE DRAWINGS

First, some remarks will be made on the use of reference signs. Like entities are denoted by like letter codes throughout the drawings. In a single drawing, various similar entities may be shown. In that case, a numeral is added to the letter code, to distinguish similar entities from each other. The numeral will be in parentheses if the number of similar entities is a running parameter. In the description and the claims, any numeral in a reference sign may be omitted for convenience.

Figure 1:
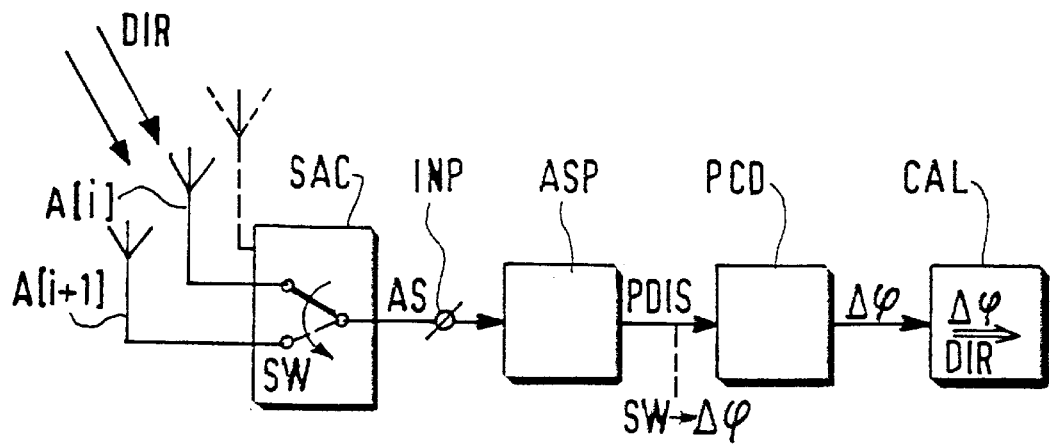
FIG. 1 is a conceptual diagram illustrating basic features of the invention as claimed in claim 1.

FIG. 1 illustrates basic features of the invention in full lines. There is a plurality of antennas A at different locations. A switchable antenna coupler SAC switches SW from one antenna A(i) being coupled to a radio-signal input INP, to another antenna A(i+1) being coupled to the radio-signal input INP. A radio-signal processor ASP processes a radio signal AS which is present at the radio-signal input INP so as to obtain a phase-detection input signal PDIS. A phase-change detector PCD detects a phase change $\Delta\phi$ in the phase-detection input signal PDIS due to the switching SW from the one antenna A(i) to the other antenna A(i+1). A calculator CAL calculates the direction DIR in which the source of the radio-signal is located on the basis of the phase change $\Delta\phi$.

With regard to the features illustrated in FIG. 1, the following aspects have been taken into consideration. In practice, it will take a certain time to switch from one antenna to another antenna. During this switching time, the phase of a radio signal received may change due to a phase modulation of the radio signal. If the phase modulation is relatively rapid in comparison with the switching time, the phase change $\Delta\phi$ in the phase-detection input signal PDIS may be considerably affected by the phase-modulation. In that case, there will be an error in the direction calculated on the basis of the phase change.

Figure 2:
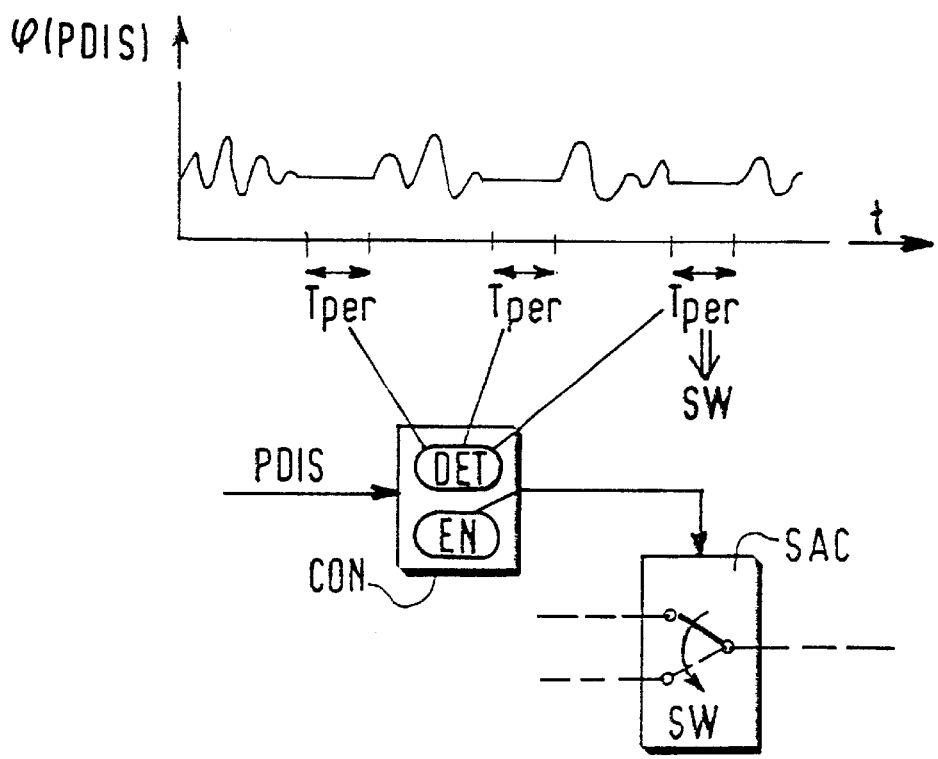
FIG. 2 is a conceptual diagram illustrating additional features as claimed in claim 2.

FIG. 2 illustrates the following features. A controller CON detects DET periods Tper of time in which the phase-detection input signal PDIS is substantially free of phase modulation. The controller CON enables EN the switchable antenna coupler SAC to switch SW during such a period of time Tper.

The features illustrated in FIG. 2 provide the following advantageous effects. Due to the fact that the switching between antennas takes place during a period of time in which the phase-detection input signal PDIS is substantially free of phase modulation, the phase change $\Delta\phi$ will substantially be determined by a phase difference of the desired radio signal in the antennas between which the switching takes place. Consequently, the features illustrated in FIG. 2 allow the direction to be calculated with relatively great precision.

Figure 3:
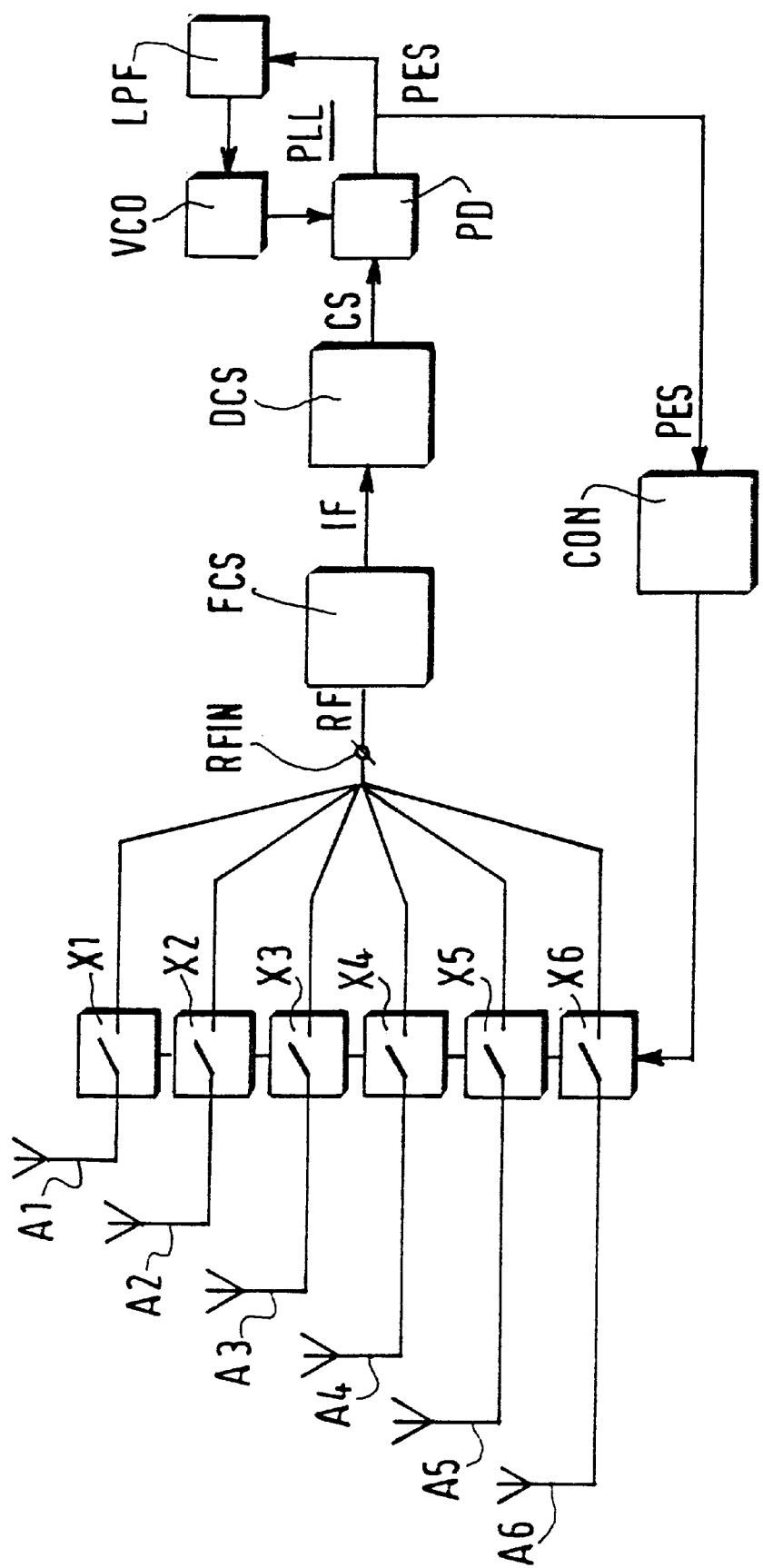
FIG. 3 is a block diagram of an example of a CDMA-receiver in accordance with the invention.

FIG. 3 shows an example of a CDMA receiver in accordance with the invention. The abbreviation CDMA stands for Code Division Multiple Access. The CDMA receiver comprises the following functional parts: a set of antennas A1–A6 which are directional and at different locations, a set of antenna-switches X1–X6, a radio-frequency input RFIN, a frequency conversion stage FCS, a de-spreading circuit DSC, a phase-locked loop PLL, and a controller CON. The phase-locked loop PLL further comprises a phase-detector PD, a loop filter LPF and a controllable oscillator VCO.

The CDMA receiver basically operates as follows. The controller CON controls the antenna-switches X1–X6 such that one of the antennas A1–A6 is coupled to the radio-frequency input RFIN. The frequency conversion stage FCS converts a radio signal RF at the radio frequency input RFIN into an intermediate-frequency signal IF. Both the radio-signal RF and the intermediate-frequency signal IF are spread spectrum signals. The de-spreading circuit DSC de-spreads, in effect, the intermediate frequency signal IF. Accordingly, the de-spreading circuit DSC applies a narrow-spectrum carrier signal CS to the phase-locked loop PLL. The phase-detector PD of the phase-locked loop PLL applies a phase-error signal PES to the controller CON.

The controller CON controls the antenna switches X1–X6 in the following manner. Let it be assumed that antenna A1 is coupled to the radio-frequency input RFIN. The controller CON determines during which periods the narrow-spectrum carrier signal CS is substantially free of phase modulation. It may do so, for example, by identifying when the radio signal RF conveys a series of zeroes or ones as information. During such a period, the controller CON de-couples the antenna A1 so as to couple another antenna, for example antenna A2, to the radio frequency input RFIN. Thus, in effect, the controller CON switches from antenna A1 to antenna A2. This will cause a sudden change in the phase-error signal PES. The controller CON measures this change which is representative of a phase-difference between the radio signal RF at the antenna A1 and A2. The controller CON then calculates on the basis of the phase-difference, an angle of arrival of the radio signal RF in a Cartesian system which is defined by the antennas A1 and A2. This calculation as such is known and described in various physics handbooks.

Subsequently, the controller CON switches from antenna A2 yet another antenna, for example antenna A3, and calculates an angle of arrival in another Cartesian system which is defined by antennas A2 and A3. Using the calculated angle of arrivals, the controller CON calculates a tri-dimensional bearing vector which points to the source of the radio signal RF. The controller CON selects the antenna whose pattern corresponds best to the tri-dimensional bearing vector. That is, it selects the antenna that provides the highest gain in the direction of the source of the radio signal RF.

The drawings and their description hereinbefore illustrate rather than limit the invention. It will be evident that there are numerous alternatives which fall within the scope of the appended claims. In this respect, the following closing remarks are made.

There are numerous way of physically spreading functions or functional elements over various units. In this respect, the drawings are very diagrammatic, each representing only one possible embodiment of the invention. Thus, although a drawing shows different functional elements as different blocks, this by no means excludes that some functional elements, or all functional elements, may be implemented as a single physical unit.

What is claimed is:

1. A radio-communication apparatus comprising:

a plurality of antennas at different locations;

a switchable antenna coupler for switching from one antenna coupled to a radio-signal input, to another antenna coupled to the radio-signal input;

an antenna-signal processor for processing a radio signal which is present at the radio-signal input so as to obtain a phase-detection input signal;

a controller which detects periods of time in which the phase-detection input signal is substantially free of phase-modulation, and enables the switchable antenna coupler to switch said plurality of antennas during said periods of time;

a phase-change detector for detecting a phase-change in the phase-detection input signal during said periods of time due to the switching from the one antenna to the other antenna;

a calculator for calculating the direction in which the source of the radio signal is located on the basis of the phase change; and an antenna controller for controlling, on the basis of the calculated direction, an antenna array such that the antenna array provides an antenna pattern which is substantially directed to the source.

2. A method of radio-signal direction finding comprising:

switching at least two antennas from one antenna coupled to a radio-signal input, to another antenna coupled to the radio-signal input, the antennas being at different locations;

processing a radio signal which is present at the radio-signal input so as to obtain a phase-detection input signal;

detecting periods of time in which the phase-detection input signal is substantially free of phase-modulation;

enabling a switchable antenna coupler to switch said at least two antennas during said periods of time; and detecting a phase-change in the phase-detection input signal during said periods of time due to the switching from the one antenna to the other antenna; and calculating the direction in which the source of the radio signal is located on the basis of the phase change.

3. A radio-signal direction finder for establishing in which direction a radio-signal source is located, the radio-signal direction finder comprising:

a plurality of antennas at different locations;

a switchable antenna-coupler for switching from one antenna coupled to a radio-signal input, to another antenna coupled to the radio-signal input;

a radio-signal processor for processing a radio signal which is present at the radio-signal input so as to obtain a phase-detection input signal;

a controller which detects periods of time in which the phase-detection input signal is substantially free of phase-modulation, and enables the switchable antenna coupler to switch said plurality of antennas during said periods of time;

a phase-change detector for detecting a phase-change in the phase-detection input signal during said periods of time due to the switching from the one antenna to the other antenna; and a calculator for calculating the direction in which the source of the radio-signal is located on the basis of the phase change.

4. A method of radio-communication comprising the steps of:

switching from one antenna coupled to a radio-signal input, to another antenna coupled to the radio-signal input, the antennas being at different locations;

processing a radio signal at the radio-signal input so as to obtain a phase-detection input signal;

detecting periods of time in which the phase-detection input signal s substantially free of phase-modulation;

enabling a switchable antenna coupler to switch the antennas during said periods of time;

detecting a phase-change in the phase-detection input signal during said periods of time due to the switching from the one antenna to the other antenna;

calculating the direction in which the source of the radio signal is located on the basis of the phase change; and controlling, on the basis of the calculated direction, an antenna array such that the antenna array provides an antenna pattern which is substantially directed to the source.

* * * * *